US009680696B1

(12) United States Patent
Firment et al.

(10) Patent No.: US 9,680,696 B1
(45) Date of Patent: Jun. 13, 2017

(54) CLOUD MIGRATION AND MAINTENANCE CONTROLS

(71) Applicant: Capital One Services, LLC, McLean, VA (US)

(72) Inventors: Drew Firment, Richmond, VA (US); Elango Sampandam, Lincolnshire, IL (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 15/213,184

(22) Filed: Jul. 18, 2016

(51) Int. Cl.
| G06F 15/173 | (2006.01) |
| H04L 12/24 | (2006.01) |
| H04L 29/08 | (2006.01) |

(52) U.S. Cl.
CPC .......... H04L 41/0803 (2013.01); H04L 67/10 (2013.01)

(58) Field of Classification Search
None
See application file for complete search history.

(56) References Cited

U.S. PATENT DOCUMENTS

| 2006/0277132 A1 | 12/2006 | Brooks | |
| 2008/0126858 A1 | 5/2008 | Barras | |
| 2010/0125473 A1* | 5/2010 | Tung | G06F 9/5072 709/200 |
| 2011/0055377 A1 | 3/2011 | Dehaan | |
| 2012/0303776 A1 | 11/2012 | Ferris | |
| 2013/0297800 A1 | 11/2013 | Considine | |
| 2013/0297802 A1 | 11/2013 | Laribi | |
| 2013/0339949 A1* | 12/2013 | Spiers | G06F 9/5077 718/1 |
| 2014/0068340 A1 | 3/2014 | Dayal | |
| 2014/0071133 A1 | 3/2014 | Chu | |
| 2014/0122577 A1* | 5/2014 | Balasubramanian | G06F 9/5072 709/203 |
| 2014/0278808 A1* | 9/2014 | Iyoob | G06Q 30/0206 705/7.35 |
| 2014/0317166 A1 | 10/2014 | Iyoob | |
| 2015/0228003 A1* | 8/2015 | Iyoob | G06Q 30/0631 705/26.64 |
| 2016/0094483 A1* | 3/2016 | Johnston | H04L 47/827 709/226 |

FOREIGN PATENT DOCUMENTS

| WO | WO 2012/021330 A2 | 2/2012 |
| WO | WO 2015/126411 A1 | 8/2015 |

OTHER PUBLICATIONS

International Search Report for International Application No. PCT/US2016/042928 mailed Sep. 30, 2016 (35 pages).

* cited by examiner

*Primary Examiner* — Joshua Joo
(74) *Attorney, Agent, or Firm* — Finnegan, Henderson, Farabow, Garrett & Dunner, L.L.P.

(57) ABSTRACT

Improved cloud migration tools are provided. In some embodiments, improved cloud migration tools may provide complex cloud migration analysis techniques for automated monitoring of aggregate compliance with cloud migration protocols, including user- and/or organizational defined architectural guidelines. In some embodiments, improved cloud migration tools may provide automated detective cloud controls, particularly in the management across multiple cloud computing platform accounts, virtual private clouds (VPCs), and/or a large numbers of numbers of resources.

20 Claims, 13 Drawing Sheets

| | 804 | 805 | 806 | 807 | | | 800 |
|---|---|---|---|---|---|---|---|
| | Account | ASV | Instance | 808a Tagging | 808b Encryption | EC2 808c Patching | 808d Resiliency |
| ▶ SANDBOX-DEV (331) | | | | 33% | 83% | 41% | 12% |
| ▼ COMMERCIAL-DEV (300) | | | | 55% | 91% | 49% | 34% |
| ▼ ASVINTELLIX (13) | | | | 88% | 100% | 8% | 88% |
| | COMMERCIAL-DEV | ASVINTELLIX | Intellix Mobile API Dev Web | ✓ | ✓ | X | ✓ |
| | COMMERCIAL-DEV | ASVINTELLIX | Intellix Mobile API QA App | ✓ | ✓ | X | ✓ |
| | COMMERCIAL-DEV | ASVINTELLIX | Intellix Mobile API QA Web | ✓ | ✓ | X | ✓ |
| | COMMERCIAL-DEV | ASVINTELLIX | Intellix Mobile API QA WAF | ✓ | ✓ | X | ✓ |
| | COMMERCIAL-DEV | ASVINTELLIX | Intellix Mobile API Dev WAF | ✓ | ✓ | X | ✓ |
| | COMMERCIAL-DEV | ASVINTELLIX | intellix-Jenkins-Steve 02 | ✓ | ✓ | X | X |
| | COMMERCIAL-DEV | ASVINTELLIX | Intellix-ApacheDemo | X | ✓ | X | X |
| | COMMERCIAL-DEV | ASVINTELLIX | TickIT-Dev | ✓ | ✓ | ✓ | X |
| | COMMERCIAL-DEV | ASVINTELLIX | intellix-Jenkins-Steve 01 | ✓ | ✓ | X | X |
| | COMMERCIAL-DEV | ASVINTELLIX | Intellix Mobile API QA App | ✓ | ✓ | X | ✓ |
| | COMMERCIAL-DEV | ASVINTELLIX | Intellix Mobile API QA WAF | ✓ | ✓ | X | ✓ |
| | COMMERCIAL-DEV | ASVINTELLIX | Intellix Mobile API QA Web | ✓ | ✓ | X | ✓ |
| | COMMERCIAL-DEV | ASVINTELLIX | Intellix Mobile API Dev App | ✓ | ✓ | X | ✓ |
| ▶ ASVCOMMODITYXL (3) | | | | 100% | 41% | 40% | 0% |
| ▶ ASVWAMWORKFLOW (10) | | | | 20% | 80% | 30% | 80% |
| ▶ ASVPEPEXCHANGE (15) | | | | 100% | 100% | 80% | 87% |
| ▶ null (54) | | | | 0% | 98% | 13% | 9% |
| ▶ ASVSPLUNKCOF (4) | | | | 100% | 100% | 100% | 100% |
| ▶ ASVDECINSIGHT (3) | | | | 100% | 100% | 100% | 67% |
| ▶ ASVCMLDOCEXCHANG... | | | | 33% | 100% | 100% | 0% |
| ▶ ASVARCHITECTURE (17) | | | | 83% | 100% | 24% | 12% |
| ▶ ASVCOMMERCIALRISK... | | | | 100% | 20% | 100% | 100% |
| ▶ ASVPERFORMANCECEN... | | | | 100% | 100% | 100% | 0% |
| ▶ ASVRECONNECT (10) | | | | 20% | 100% | 100% | 0% |

CLOUD MIGRATION AND MAINTENANCE CONTROLS

TECHNICAL FIELD

The present disclosure relates generally to improvements in electrical message presentation, computerized simulations, graphical user interfaces, and automated monitoring of cloud migration protocols.

BACKGROUND

Cloud computing, often referred to as simply "the cloud," is the practice of using shared, on-demand computing resources hosted on the Internet on a pay-for-use basis. Cloud computing offers several advantages over traditional data center computing environments, such as the utilization of elastic resources that can be scaled up or down quickly and easily to meet demand. Thus, in recent years, cloud services have rapidly become one of the most adopted technologies in information technology (IT).

To take advantage of these cloud computing advantages, however, an organization typically must relocate its existing software services. This process—known as cloud migration—involves moving data, applications, and/or other business elements from an organization's onsite computers, typically one or more data centers, to the cloud. Transitioning to the cloud, however, presents new IT challenges associated with interoperability, data and application portability, data integrity, business continuity, and security. These challenges stem from, among other things, the fact that applications designed to operate in legacy data centers cannot take advantage of many benefits offered by the cloud architecture. Thus, an organization migrating its software solutions from a data center to the cloud must reconfigure its current software solutions to take advantage of these benefits.

As part of the migration process, organizations typically set out production readiness criteria defining when software solutions being migrated are ready for cloud deployment. Currently, however, no tools exist for organizations to adequately track compliance with its production readiness criteria, much less assess the overall progress of its cloud transformation efforts as the infrastructure for software solutions becomes code based.

Accordingly, a need exists for improved cloud migration tools capable of addressing these and other shortcomings within the technology field. For example, a need exists for improved cloud migration tools providing aggregate oversight of compliance with cloud migration protocols, including user-defined architectural guidelines for a coded infrastructure. Moreover, there is a need for improved cloud migration tools providing automated detective cloud controls, particularly in the management across multiple cloud computing platform accounts, virtual private clouds (VPCs), and/or a large numbers of resources.

SUMMARY

Disclosed embodiments provide consolidated monitoring, analyses, and reporting of cloud transformation efforts according to organization- and/or user-defined architectural guidelines.

Consistent with the present embodiments, an exemplary system for automated monitoring of cloud migration protocols is provided. The system may include a Configuration Management Database (CMDB) and one or more processors in communication with the CMDB and configured to execute stored software instructions. The system may execute the software instructions to perform operations. For example, the system may execute the software instructions to identify a plurality of cloud migration control parameters for assessing cloud deployment readiness of software technology assets according to operational criteria and cost metrics. The system may further execute the software instructions to access the CMDB, via at least one asset list Application Programming Interface (API), to identify a plurality of technology assets having application names. The system may also execute the instructions to determine a portfolio group associated with each of the identified plurality of technology assets from a plurality of portfolio groups and access, via at least one tagged list API, a cloud computing platform to determine a plurality of tagged technology assets, each tagged technology asset having an application name identified in the cloud computing platform. The system may also execute the instructions to continually determine an architectural optimization position for each portfolio group based on architectural component parameters of each of the plurality of tagged technology assets and the operational criteria. The system may also execute the instructions to continually determine an efficiency position for each portfolio group based at least on workload utilization for each tagged technology asset and the cost metrics. The system may also execute the instructions to continually determine a cloud migration implementation status based on at least one transition statistic and generate interface data representing an aggregate status of the plurality of technology assets by portfolio group according to the determined architectural optimization position, efficiency position, and cloud migration implementation status.

Consistent with the present embodiments, an exemplary process for automated monitoring of cloud migration protocols is also provided. The process may include identifying a plurality of cloud migration control parameters for assessing cloud deployment readiness of software technology assets according to operational criteria and cost metrics. The process may also include accessing a Configuration Management Database (CMDB), via at least one asset list Application Programming Interface (API), to identify a plurality of technology assets having application names. The process may also include determining a portfolio group associated with each of the identified plurality of technology assets from a plurality of portfolio groups and accessing, via at least one tagged list API, a cloud computing platform to determine a plurality of tagged technology assets (e.g., applications), each tagged technology asset having an application name identified in the cloud computing platform. The process may also include continually determining an architectural optimization position for each portfolio group based on architectural component parameters of each of the plurality of tagged technology assets and the operational criteria. The process may also include continually determining an efficiency position for each portfolio group based at least on workload utilization for each tagged technology asset and the cost metrics. The process may also include continually determining a cloud migration implementation status based on at least one transition statistic and generate interface data representing an aggregate status of the plurality of technology assets by portfolio group according to the determined architectural optimization position, efficiency position, and cloud migration implementation status.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 8 is a diagram of an exemplary interface providing information associated with various exemplary cloud migration measurements and compliance metrics for software technology asset portfolio groups at a software technology asset application level, consistent with disclosed embodiments.

FIG. 10 is another diagram of an exemplary interface for reporting further software technology asset limits information, consistent with disclosed embodiments.

DESCRIPTION OF THE EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Disclosed embodiments solve the problems listed above that were recognized by the inventors of the present subject matter, as well as other problems. In some embodiments, improved cloud migration tools are provided for aggregate oversight of compliance with cloud migration protocols, including user- and/or organizational defined architectural guidelines. In some embodiments, improved cloud migration tools are provided for automated detective cloud controls, particularly in the management across multiple cloud computing platform accounts, virtual private clouds (VPCs), and/or a large numbers of resources.

Figure 1:
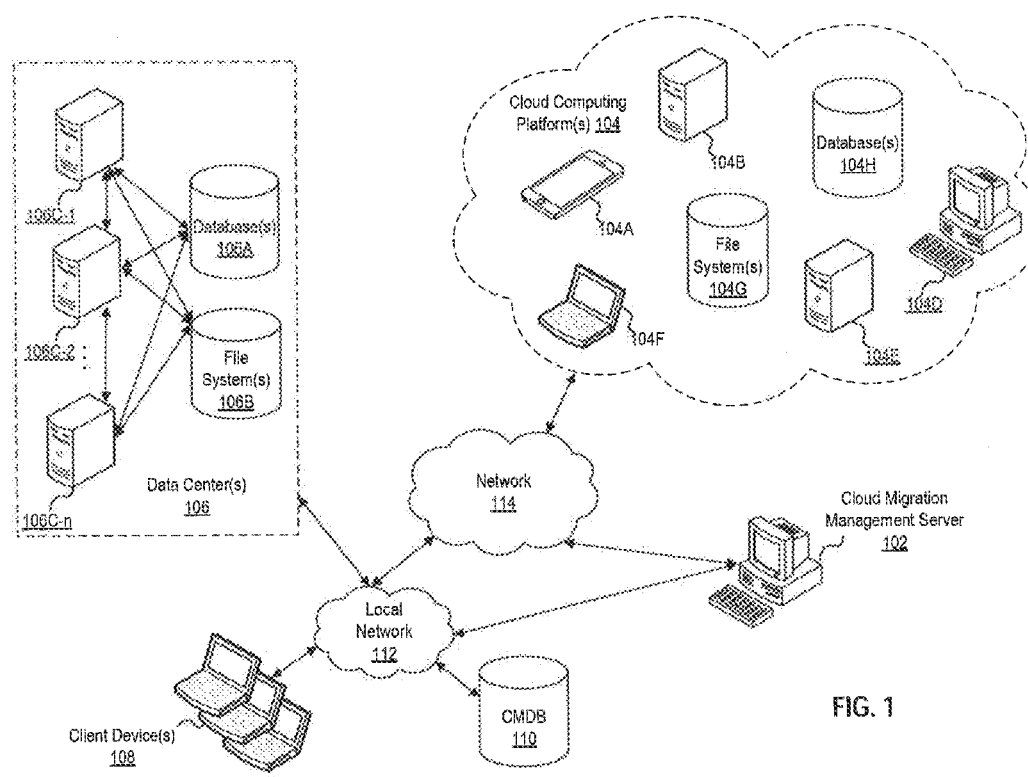
FIG. 1 is a diagram of an exemplary cloud migration environment that may be continuously monitored for compliance with cloud migration protocols, consistent with disclosed embodiments.

FIG. 1 shows an exemplary cloud migration environment 100 that may be continuously monitored for compliance with cloud migration protocols, consistent with disclosed embodiments. The components and arrangements shown in FIG. 1 are not intended to limit the disclosed embodiments, as the components used to implement the disclosed processes and features may vary. Thus, cloud migration environment 100 may further include other components that perform or assist in the performance of one or more processes consistent with the disclosed embodiments.

In accordance with disclosed embodiments, cloud migration environment 100 may include cloud migration management server (CMMS) 102, cloud computing platform(s) 104, data center(s) 106, client device(s) 108, Configuration Management Database (CMDB) 110, local network 112, and Network 114. Components and subcomponents of cloud migration environment 100 may communicate through Network 114 and/or local network 112. In some embodiments, various components of cloud migration environment 100 (e.g., client devices 108, CMDB 110, and CMMS 102) may be physically disposed within an office building or physical location associated with an entity (e.g., an organization migrating software technology assets); however, such components may also be disposed in physically separate locations but connected via a network administered by or associated with the entity (e.g., via local network 112).

CMMS 102 may be a computing device configured to continuously monitor compliance with cloud migration protocols, consistent with disclosed embodiments. A user may operate a CMMS 102, which may be one or more general-purpose computers, mainframe computers, dedicated hardware, or any combination of these types of components. CMMS 102 may include one or more processor(s) and memory device(s) known to those skilled in the art. For example, CMMS 102 may include memory device(s) that store data and software instructions that, when executed by one or more processor(s), perform operations consistent with the disclosed embodiments.

In one aspect, CMMS 102 may have a software application installed thereon, which may enable CMMS 102 to communicate with other components of cloud migration environment 100 (e.g., cloud computing platforms 104, data centers 106, client devices 108, and/or CMDB 110) via local network 112 and/or Network 114. For instance, CMMS 102 may execute a software application connecting CMMS 102 to cloud computing platforms 104, client device(s), and/or CMDB 110 through an application programming interface (API) configured to communicate information between the components, and/or through use of browser software stored and executed by CMMS 102. CMMS 102 may be configured to execute software instructions to access information stored in cloud computing platforms 104, such as, for example, data associated with a plurality of cloud migration control parameters, data associated with a plurality of tagged technology assets (e.g., applications) implemented on the cloud computing platform, and the like. CMMS 102 may also be configured to execute software instructions to access information stored in CMDB 110, such as, for example, data relating to configuration items of a plurality of technology assets implemented in data centers 106, data relating to configuration items of a plurality of technology assets implemented in cloud computing platforms 104, and the like. CMMS 102 may be configured to execute software instructions to access information stored in client devices, such as, for example, data relating to new configuration items for a technology asset being migrated from data centers 106 to cloud computing platforms 104, and the like.

In certain embodiments, CMMS 102 may be configured as a particular apparatus, system, and the like based on the storage, execution, and/or implementation of the software instructions that perform one or more operations consistent with the disclosed embodiments. CMMS 102 may be standalone, or it may be part of a subsystem, which may be part of a larger system. For example, CMMS 102 may represent distributed servers that are remotely located and communicate over a network (e.g., Network 114) or a dedicated network, such as a local network 112, for a financial service provider providing technology assets to customers in the form of software solutions (e.g., mobile payment solutions, online banking solutions, etc.). An exemplary computing system consistent with CMMS 102 is discussed in additional detail with respect to FIG. 3, below.

Cloud computing platform(s) 104 may house and maintain information technology (IT) systems and data stores off-premises for an entity. In some embodiments, cloud computing platform(s) 104 may comprise a shared pool of configurable computing resources (e.g., networks, servers, storage, applications and services) that can be rapidly provisioned and released with minimal management effort from the entity implementing its IT systems on the cloud. For example, cloud computing platform(s) 104 may comprise one or more cloud computing resources 104A-H hosted by a provider of cloud computing services such as Amazon Web Services, Google Cloud Platform, Rackspace Cloud, etc. Computing resources 104A-H may comprise, for example, physical or virtual resources including servers (e.g., computing devices 104A-F), storage (e.g., file system(s) 104G and database(s) 104H), networks (not shown), applications (not shown), and services (not shown). Cloud computing platform(s) 104 may provide various types of cloud computing services, including Infrastructure as a Service (IaaS), Platform as a Service (PaaS), and Software as a Service (SaaS). Cloud computing platform(s) 104 may store tagging data (e.g., in file system(s) 104G and database(s) 104H) reflecting the categorization of software technology. In some embodiments, for example, tagging data may comprise metadata associated with instances, images, and other cloud resources (e.g., AWS EC2 resources) including, for example, owner, stack, purpose, environment, etc. Other types of cloud computing services are possible. Cloud computing platform(s) 104 may be implemented as a public cloud, private cloud, or hybrid cloud. Cloud computing platform(s) 104 may communicate with other components of cloud migration environment 100 via network 114 and/or local network 112.

Cloud computing services may be provided under various pricing models. For example, a cloud computer services provider may sell access to cloud computing platform 104 based on a fixed and/or dynamic pricing model according to the type of cloud services involved, traffic, storage space, server CPU time, or a combination of these factors. The pricing may be a "pay-as-you-go" model having a fixed price per unit of use (e.g., per hour of virtual machine usage), or a "pay for resources" model having a price based on the amount of bandwidth, storage, etc. utilized. Other pricing models and arrangements are possible.

Data center(s) 106 may house and maintain IT systems and data stores for an entity. In some embodiments, data center(s) 106 may comprise a plurality of networked computer servers and storage for centralizing the remote storage, processing, or distribution of data. For example, data center(s) 106 may comprise a plurality of dedicated servers 106C-1 to 106C-n, database(s) 106A, and file system(s) 106B. Data center(s) 106 may be of limited capacity in that the amount of storage and workload the data center can withstand cannot change without purchasing and installing more physical equipment by the entity. Consistent with disclosed embodiments, data center(s) 106 may require high management effort from the entity implementing its IT systems on data center(s) 106. Data center(s) 106 may communicate with other components of cloud migration environment 100 via local network 112.

Client device(s) 108 may comprise personal computing devices such as, for example, general purpose or notebook computers, mobile devices with computing ability, tablets, smartphones, wearable devices such as Google Glass™ or smart watches, or any combination of these computers and/or affiliated components. Client device(s) 108 may be operated by one or more employees of an organization migrating software technology assets from a private data center to the cloud. For example, one or more employees may operate client device(s) 108 to define architectural guidelines that define the organization's expectations for risk mitigation and cost optimization during cloud migration. Additionally, or alternatively, in another example, one or more employees may be software programmers operating client device(s) to interact with (e.g., create, modify, re-architect, reprogram, delete, etc.) the organization's software technology assets as part of the cloud migration. Additionally, or alternatively, in yet another example, one or more employees may operate client device(s) 108 to tag software technology assets in the cloud, add/remove software technology assets from CMDB 110 and/or cloud computing platform(s) 104, and/or access interface data generated by cloud migration management server 102. Client device(s) 108 may communicate with other components of cloud migration environment 100 via Network 114 and/or local network 112.

Configuration Management Database (CMDB) 110 may be an enterprise system of record identifying software technology assets of an organization, as well as which servers and databases facilitate which IT services, their location (e.g., IP address, etc.) and capacity (e.g., server capacity, memory capacity, etc.), and other such information about the IT infrastructure. CMDB 110 may identify software technology assets of an organization regardless of whether the software assets are deployed in data center(s) 106 or cloud computing platform(s) 104. CMDB 110 may communicate with other components of cloud migration environment 100 via local network 112. In some embodiments, CMDB 110 may be implemented in cloud computing platform(s) 104.

Network 114 may comprise any type of computer networking arrangement used to exchange data. For example, network 114 may include the Internet, a private data network, virtual private network using a public network, and/or other suitable connection(s) that enables components of cloud migration environment 100 to send and receive information with other components. Network 114 may also include a public switched telephone network ("PSTN") and/or a wireless network.

Local network 112 may comprise any type of computer networking arrangement used to exchange data in a localized area, such as WiFi, Bluetooth™, Ethernet, or other suitable network connections that enable components on local network 112 to interact with one another and to connect to Network 114 for interacting with other components in cloud migration environment 100. In some embodiments, local network 112 may comprise an interface for communicating with or linking to Network 114. In some embodiments, local network 112 may be a subset Network 114. In other embodiments, components on local network 112 may communicate with other components of cloud migration environment 100 via Network 114, without a separate local network 112.

Figure 2:
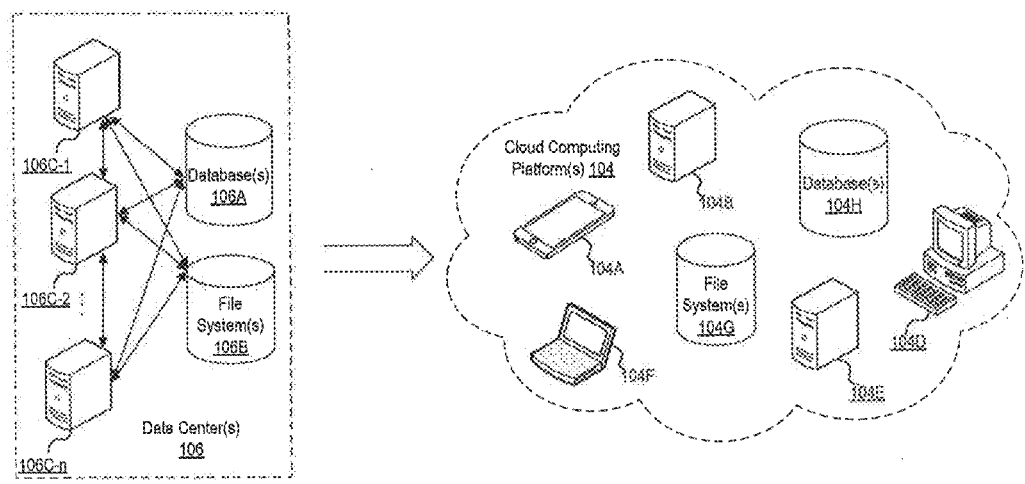
FIG. 2 is an illustration of various concepts associated with cloud migration, consistent with disclosed embodiments.

FIG. 2 is an illustration of various concepts associated with cloud migration, consistent with disclosed embodiments. As discussed above, cloud computing offers several advantages over traditional data center computing environments. Thus, consistent with disclosed embodiments, an organization may wish to migrate a plurality of software technology assets (e.g., websites, software solutions, mobile apps, etc.) from data center(s) 106 to cloud computing platform(s) 104. For example, a financial service provider may wish to deploy mobile payment solutions, online banking solutions, etc. as cloud-based solutions using cloud computing platform(s) 104 instead of using data center(s) 106 as the underlying infrastructure.

The architecture for cloud-based applications, however, is inherently different from applications designed for legacy data centers. Whereas software solutions constructed for implementation in a data-center rely on persistent resources (i.e., servers, databases, etc.), cloud-based applications operate on an infrastructure built in code. That is, the infrastructure in which cloud-based applications operate comprise virtual resources that do not require the continual maintenance (e.g., operating system upgrades, software patches, replacement parts for failed hardware components, etc.) that causes the resources executing an application to mutate over time. As a result, cloud-based applications may be designed differently to treat these cloud resources as commodities instead of the unique instances that they are in data centers.

For example, cloud-based applications may be designed with a "design for failure" cloud architecture in mind such that a combination of software and management tools take responsibility for application availability, and the data center's infrastructure availability becomes irrelevant to application availability. In particular, cloud-based solutions may take advantage of autoscaling, also known as automated elasticity, which refers to the dynamic varying of computational resources allocated to an application based on computational need. Cloud-based applications take advantage of autoscaling through the use of immutable workloads. Because the underlying infrastructure (e.g., the virtual servers) executing an application does not change, the workload may run across replicated instances. Thus, as demand increases for any given application, the instance running the application can be replicated as needed to handle the demand. Similarly, as demand subsides, the number of instances running the application may scale back down.

To take advantage of these and other benefits, however, an organization migrating a plurality of software technology assets from data center(s) 106 to cloud computing platform(s) 104 must reconfigure those software technology assets to operate on a cloud infrastructure. Organizations thus need to continuously assess and track the progress of these cloud transformation efforts across various dimensions reflecting architectural maturity, cost optimization, and the quantity of software technology assets migrated to the cloud. The dimensions reflecting cloud migration efforts may include, but are not limited to, encryption, resiliency, tagging, and patching. Encryption refers to, for example, the encryption of data stored in the cloud for any given software technology assets, including machine images (such as Amazon Machine Images (AMI)), objects (such as Amazon S3 objects), incremental backups (such as Amazon EBS snapshots), databases (such as Amazon Relational Database Service (RDS)), and any additional data volumes (such as Amazon Elastic Block Stores (EBSs)) attached to an instance. Resiliency refers to, for example, an application's ability to react to planned or unplanned outages so as to maintain seamless availability. For example, an application's association with an autoscaling group may indicate resiliency. Tagging refers to, for example, the categorization of software technology assets through the assignment of metadata to instances, images, and other resources (e.g., AWS EC2 resources) including, for example, owner, stack, purpose, environment, etc. Patching refers to, for example, the updating of operating systems, applications, and/or supporting data for software technology asset instances.

The ability to monitor many of the above details reflecting the infrastructure used to deploy a software technology asset changes drastically once moved to the cloud. Traditional data centers typically comprise numerous devices (e.g., thousands) found across numerous proprietary closed systems. As a result, any ability to monitor the data center's infrastructure requires installation of special software on each device that is specific to the proprietary closed system in which it resides. Moreover, each proprietary system's software is often not compatible with other proprietary systems' software.

Implementing infrastructure as code, however, allows disclosed embodiments to access all architectural components of the infrastructure accessible via the code, for example, through Application Programming Interfaces (APIs). Thus, consistent with disclosed embodiments, the configuration of any given network, storage, database, and computational resource forming part of the infrastructure is readily available on both an individual and aggregate basis. Moreover, disclosed embodiments provide systems and methods for automated detective cloud control according to user- and/or organizational-defined architectural guidelines that govern expectations for risk mitigation and cost optimization. For example, disclosed embodiments may continuously monitor cloud migration protocols associated with a coded infrastructure according to the following guidelines based on resource type:

TABLE 1

| 1.0 Elastic Compute Cloud (EC2) | |
|---|---|
| 1.1 Tagging | EC2 is tagged with required set of Keys and Values |

TABLE 1-continued

| | | |
|---|---|---|
| 1.2 | Encryption | EC2 is an approved instance type that supports encryption |
| 1.3 | Monitoring | EC2 is monitored with Cloud Watch thresholds and actions |
| 1.4 | AMI (Linux) | EC2 (Linux) is refreshed at least every 60 days using current AMI |
| 1.5 | AMI (Windows) | EC2 (Windows) is refreshed at least every 60 days using current AMI |
| 1.6 | Resiliency | EC2 is in Auto Scaling Group with a minimum value of at least 2 |
| 2.0 | Elastic Block Storage (EBS) | |
| 2.1 | Tagging | EBS is tagged with required set of Keys and Values |
| 2.2 | Encryption | EBS data volume is encrypted |
| 2.3 | Monitoring | EBS is monitored with Cloud Watch thresholds and actions |
| 2.4 | Snapshots | EBS data volume is backed-up vis daily snapshot (automated) |
| 3.0 | Elastic Load Balancer (ELB) | |
| 3.1 | Tagging | ELB is tagged with required set of Keys and Values |
| 3.2 | Monitoring | ELB is monitored with Cloud Watch thresholds and actions |
| 3.3 | CNAME | ELB is using a registered CNAME if customer facing |
| 3.4 | Access Logging | ELB access logging is enabled |
| 3.5 | Resiliency | ELB is deployed in multiple available zones |
| 4.0 | Relational Database Service (RDS) | |
| 4.1 | Tagging | RDS is tagged with required set of Keys and Values |
| 4.2 | Encryption | RDS is encrypted at creation |
| 4.3 | Monitoring | RDS is monitored with Cloud Watch thresholds and actions |
| 4.4 | Patching | RDS maintenance window is defined for automated patches |
| 4.5 | Backups | RDS automated backups are enabled with 21 day retention |
| 4.6 | Access Control | RDS is using DB subnet and not publicly available |
| 4.7 | Resiliency | RDS is deployed in multiple availability zones |
| 5.0 | Simple Storage Service (S3) | |
| 5.1 | Tagging | S3 is tagged with required set of Keys and Values |
| 5.2 | Encryption | S3 objects are encrypted |
| 5.3 | Version Control | S3 versioning is enabled for the buckets |
| 5.4 | Access Control | S3 end-point is properly secured using ACLs |
| 5.5 | Access Control | S3 is not setup with public access |
| 5.6 | Access Logging bucket | S3 access logging is enabled for the |
| 6.0 | Identity Access Management | |
| 6.1 | Access Control | Access is provisioned via identity/access management solutions |
| 7.0 | Network Management | |
| 7.1 | Subnets | Each application is hosted on a separate subnet |
| 7.2 | Security Groups | Security Groups are used to segregate tiers. |
| 7.3 | NACLs | NACLs are used to segregate applications |
| 7.4 | WAF | A WAF is used to inspect application layer traffic for web applications |
| 8.0 | System Monitoring | |
| 8.1 | SNS Topic | SNS values are setup correctly in order to enable system alerts |
| 8.2 | CMDB CI | A CI is setup in the CMDB and matches the AWS Tag |
| 9.0 | Disaster Recovery (Platinum) | |
| 9.1 | Cross Region Replication | All services and data are replicated between East and West Regions |

Figure 3:
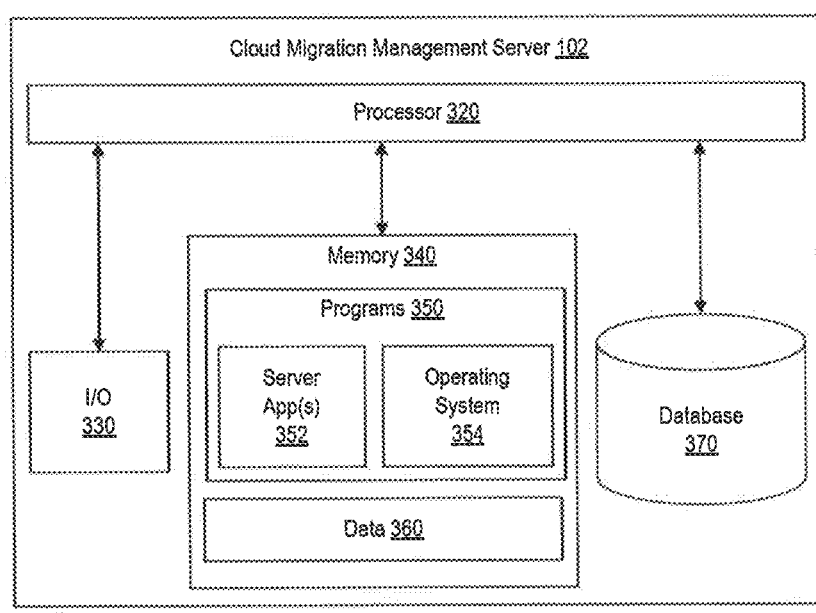
FIG. 3 is a diagram of an exemplary cloud migration management server that may be used to continuously monitor compliance with cloud migration protocols, consistent with disclosed embodiments.

FIG. 3 shows a diagram of an exemplary cloud migration management server (CMMS) 102, consistent with disclosed embodiments. As shown, CMMS 102 may include one or more of processors 320, input/output ("I/O") devices 330, memory 340 storing programs 350 including, for example, server app(s) 352, operating system 354, and storing data 360, and a database 370. CMMS 102 may be a single server or may be configured as a distributed computer system including multiple servers or computers that interoperate to perform one or more of the processes and functionalities associated with the disclosed embodiments. In some embodiments, CMMS 102 may be implemented in cloud computing platform(s) 104.

Processor 320 may be one or more known processing devices, such as a microprocessor from the Pentium™ family manufactured by Intel™ or the Turion™ family manufactured by AMD™. Processor 320 may constitute a single core or multiple core processors that executes parallel processes simultaneously. For example, processor 320 may be a single core processor configured with virtual processing technologies. In certain embodiments, processor 320 may use logical processors to simultaneously execute and control multiple processes. Processor 320 may implement virtual machine technologies, or other known technologies to provide the ability to execute, control, run, manipulate, store, etc. multiple software processes, applications, programs, etc. In another embodiment, processor 320 may include a multiple-core processor arrangement (e.g., dual, quad core, etc.) configured to provide parallel processing functionalities to allow cloud server 108 to execute multiple processes simultaneously. One of ordinary skill in the art would understand that other types of processor arrangements could be implemented that provide for the capabilities disclosed herein.

CMMS 102 may also include one or more I/O devices 330 that may comprise one or more interfaces for receiving signals or input from devices and providing signals or output to one or more devices that allow data to be received and/or transmitted by CMMS 102. For example, CMMS 102 may include interface components, which may provide interfaces to one or more input devices, such as one or more keyboards, mouse devices, and the like, that enable cloud server 108 to receive input from a user, such as user 112.

Cloud server 108 may include one or more storage devices configured to store information used by processor 320 (or other components) to perform certain functions related to the disclosed embodiments. In one example, CMMS 102 may include memory 340 that includes instructions to enable processor 320 to execute one or more applications, such as server applications, cloud migration management applications, network communication processes, and any other type of application or software known to be available on computer systems. Alternatively or additionally, the instructions, application programs, etc. may be stored in an internal database 370 or external storage in direct communication with CMMS 102 (not shown), such as one or more database or memory accessible over network 114. Database 370 or other external storage may be a volatile or non-volatile, magnetic, semiconductor, tape, optical, removable, non-removable, or other type of storage device or tangible (i.e., non-transitory) computer-readable medium.

In one embodiment, CMMS 102 may include memory 340 that includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. For example, CMMS 102 may include memory 340 that may include one or more programs 350 to perform one or more functions of the disclosed embodiments. Moreover, processor 320 may execute one or more programs located remotely from system 100. For example, cloud server 108 may access one or more remote programs, that, when executed, perform functions related to disclosed embodiments.

Programs 350 stored in memory 340 and executed by processor(s) 220 may include one or more server app(s) 352 and operating system 354. Server app(s) 352 may incorporate one or more cloud migration management apps that cause processor(s) 320 to execute one or more processes related to cloud migration including, but not limited to, determining and/or identifying cloud migration control parameters for assessing cloud deployment readiness of software technology assets, continuously monitoring compliance with cloud migration protocols, generating interface data representing the aggregate migration status of software technology assets being moved from data centers to the cloud, automatically flagging compliance issues with user- and/or organization-defined operational criteria and costs metrics for cloud deployment, etc. Memory 340 and database 370 may include one or more memory devices that store data and instructions used to perform one or more features of the disclosed embodiments. Memory 340 and database 370 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

CMMS 102 may also be communicatively connected to one or more remote memory devices (e.g., remote databases (not shown)) through network 114 or a different network. The remote memory devices may be configured to store information and may be accessed and/or managed by CMMS 102. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

While other components of cloud migration environment 100 may not be configured in an identical or similar way to CMMS 102, the above components and configurations described with respect to CMMS 102 could also apply to the other components of cloud migration environment 100.

The following embodiments are described as performed primarily by CMMS 102. In some embodiments, however, one or more other components of cloud migration environment 100 may be used in place of CMMS 102 for some or all of the disclosed steps or functions. Furthermore, the following embodiments are described as performed on data associated with a particular organization migrating software technology assets from data centers to the cloud. In some embodiments, however, CMMS 102 may be used to monitor cloud migration data associated with any number of organizations, business divisions, various lines of business within an organization, etc.

Figure 4:
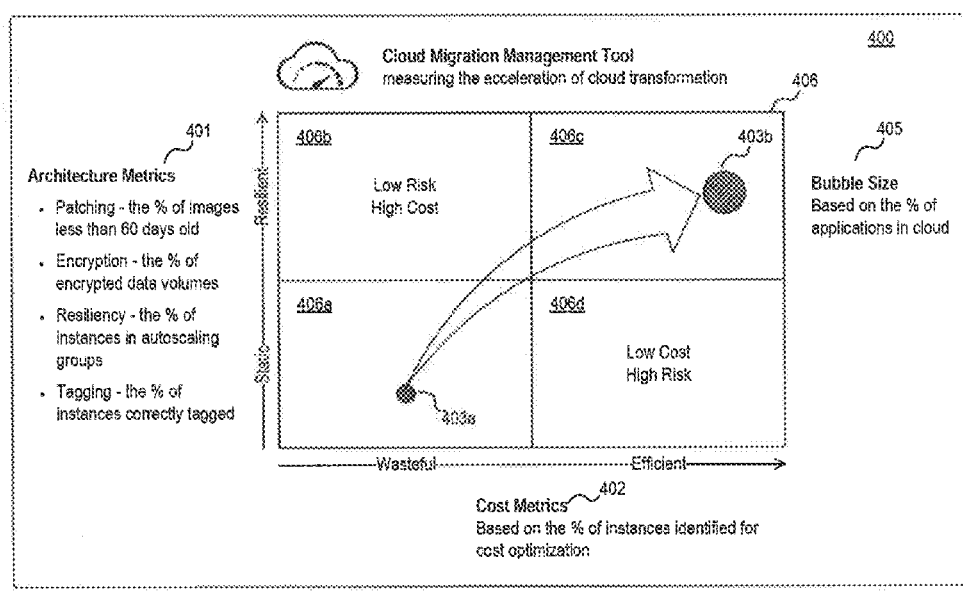
FIG. 4 is a diagram providing representative information associated with exemplary interfaces for displaying various exemplary cloud migration measurements and compliance metrics, consistent with disclosed embodiments.

FIG. 4 is a diagram providing representative information associated with exemplary interfaces for displaying various exemplary cloud migration measurements and compliance metrics, consistent with disclosed embodiments. Consistent with disclosed embodiments, exemplary interface 400 includes an explanation of various aspects associated with interface data generated by CMMS 102 representing the aggregate status of a plurality of software technology assets being migrated from a data center (e.g., data center(s) 106) to the cloud (e.g., clouds 104). For example, the plurality of software technology assets depicted on interfaces consistent with interface 400 may comprise tagged software technology assets associated with a particular portfolio group.

As shown in FIG. 4, the aggregate status of the portfolio group's migration to the cloud may be represented on interfaces consistent with interface 400 by the location (e.g., (x, y) points) and size of one or more plot points (portfolio points 403a, 403b) on a coordinate plane 406 associated the portfolio group. Consistent with disclosed embodiments, CMMS 102 may continually determine the size and location data for the portfolio points of one or more portfolio groups of tagged software technology assets. For example, CMMS 102 may determine an efficiency position for a given portfolio point based on, for example, cost metrics 402 and overall workload utilization rates associated with the tagged technology asset of the portfolio group. Cost metrics 402 may comprise, for example, the percentage of application instances identified for cost optimization according to user- and/or organization-defined criteria. In some embodiments, the efficiency position may represent the portfolio point's x-axis position on an (x, y) coordinate plane. In some embodiments, CMMS 102 may determine an architectural optimization position for a given portfolio point based on, for example, operational criteria and architectural component parameters associated with one or more of the plurality of tagged technology assets associated with the portfolio group. Architectural component parameters may comprise, for example, one or more architecture metrics 401, including patching, encryption, resiliency, and tagging metrics. For example, as shown in FIG. 4, the patching metric may comprise the percentage of machine images less than a specified number of days old (e.g., 60 days) defined by organization- and/or user-defined architectural guidelines for patching machine images. The encryption metric may comprise the percentage of encrypted data volumes associated with the portfolio group. The resiliency metric may comprise the percentage of instances associated with an autoscaling group. The tagging metric may comprise the percentage of instances tagged in compliance with organization- and/or user-defined architectural guidelines for tagging software technology assets.

In some embodiments, the architectural optimization position may represent the portfolio point's y-axis position on an (x, y) coordinate plane. Moreover, CMMS 102 may determine a cloud migration implementation status dictating the size of the portfolio point based on one or more transition statistics, such as the percentage of software technology assets belonging to the portfolio group implemented in the cloud. Accordingly, consistent with disclosed embodiments, CMMS 102 may generate interface data representing the aggregate status of the plurality of technology assets by portfolio group according to the determined architectural optimization position, efficiency position, and cloud migration implementation status. Consistent with disclosed embodiments, interface 400 and other disclosed interfaces may be generated based on the determined interface data.

Consistent with disclosed embodiments, interfaces consistent with interface 400 may also include quadrants 406a-d, wherein inclusion of a portfolio point within a particular quadrant indicates the general migration status (e.g., compliance with cloud migration protocols) for the associated portfolio group as high risk, high cost (quadrant 406a), high cost, low risk (quadrant 406b), low risk, low cost (quadrant 406c), or low cost, high risk (quadrant 406d).

For example, FIG. 4 includes a portfolio point 403a within quadrant 406a, indicating the plurality of software technology assets associated with that portfolio group have a "high risk, high cost" status at a first point in time. FIG. 4 also includes a portfolio point 403b found within quadrant 406c, indicating the plurality of software technology assets associated with that portfolio group have a "low risk, high low" status at a second point in time. Furthermore, as shown in FIG. 4, portfolio point 403b is larger in size as compared to portfolio point 403a, indicating a larger percentage of software technology assets within the portfolio group having transitioned from a data center environment (e.g., data center(s) 106) to the cloud (e.g., cloud computing platform(s) 104).

Consistent with disclosed embodiments, CMMS 102 may identify additional characteristics associated with the portfolio group's migration to the cloud based on the path that a portfolio point takes through quadrants 406a-d over time. For example, in some embodiments, CMMS 102 may determine a migration stage and/or event of interest based on the path that a portfolio point takes through quadrants 406a-d over time. For ease of discussion, FIG. 4 depicts a path 404 showing an exemplary path through quadrants 406a-d that a portfolio group may take in interface 400 over time, such as the time period between the determination of portfolio point 403a and portfolio point 403b. Indeed, for reasons detailed below, path 404 may represent a typical path through quadrants 406a-d starting in quadrant 406a, passing through quadrant 406b, and arriving in quadrant 406c.

As noted above, FIG. 4 includes a portfolio point 403a within quadrant 406a, indicating the plurality of software technology assets associated with that portfolio group have a "high risk, high cost" status at a first point in time. Consistent with disclosed embodiments, CMMS 102 may determine (e.g., based on historical data) that a high risk, high cost status designation may indicate a portfolio group in its early stages of migration to the cloud. For example, software technology assets recently migrated to the cloud may often include oversized instances, resulting in a higher number of instances being identified for cost optimization and contributing to a "high cost" designation. Continuing the example, a "high risk" designation may be the result of the programmers tasked with reconfiguring the technology assets for cloud deployment being initially unfamiliar with the cloud migration compliance metrics. Additionally or alternatively, programmers may simply be in the early stages of encrypting data stored in the cloud for the software technology assets, properly tagging the software technology assets associated with the portfolio group, reconfiguring the software technology assets for autoscaling, etc. Similarly, a smaller plot point 403a indicating a lower percentage of software technology assets are implemented in cloud computing platform(s) 104 may be the result of programmers being in the early stages of migrating software technology assets for a portfolio group to the cloud.

Continuing along path 404, CMMS 102 may determine that a portfolio point in quadrant 406b (not shown), subsequent to determining plot point 403a in quadrant 406a, indicates the portfolio group is at some mid-point in the migration process. Consistent with disclosed embodiments, CMMS 102 may also determine the portfolio group is at some mid-point in the migration process when the portfolio point in quadrant 406b (not shown) moves substantially upward along the y-axis without a corresponding move right along the x-axis based on a determination that, for example, user-defined architectural guidelines emphasis improving resiliency, encryptions, etc. over improving efficiency, cost considerations, etc. during cloud migration. Finally, CMMS 102 may determine that a portfolio group is nearing full or acceptable migration to the cloud (e.g., cloud computing platform 104) based on portfolio point 403b being large and located in the upper right corner of quadrant 406c.

Figure 5:
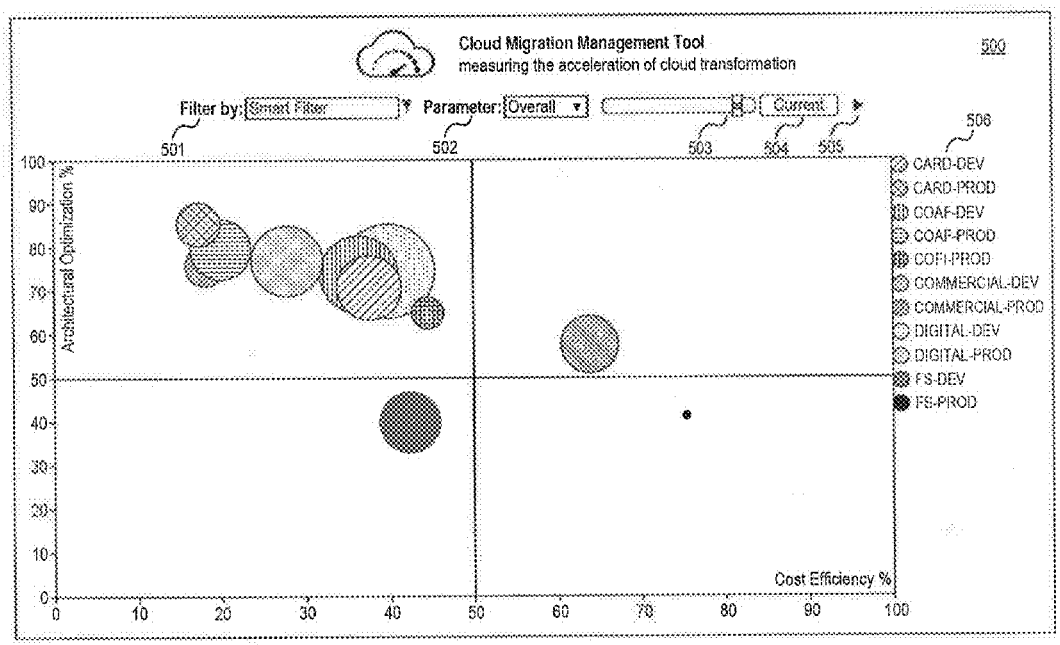
FIG. 5 is a diagram of an exemplary interface providing information associated with various exemplary cloud migration measurements and compliance metrics for portfolio groups of software technology assets, consistent with disclosed embodiments.

FIG. 5 is a diagram of an exemplary interface 500 providing information associated with various exemplary cloud migration measurements and compliance metrics for portfolio groups of software technology assets, consistent with disclosed embodiments. For ease of discussion, disclosed embodiments may refer to disclosed interfaces, including interface 500, being displayed on a CMMS 102; however, disclosed interfaces can be adapted for and displayed on other components of cloud migration environment 100, such as client device(s) 108. Consistent with interface 400, interface 500 displays the aggregate migration status of a plurality of listed portfolio groups 506 to the cloud represented by the location (e.g., (x, y) points) and size of one or more plot points associated with each portfolio group on a coordinate plane having four quadrants. For example, as shown, interface 500 includes one portfolio group present in the low cost (i.e., FS-PROD), high risk quadrant, one portfolio group present in the high cost, high risk quadrant (i.e., FS-DEV), one portfolio group present in the low cost, low risk quadrant (i.e., COMMERCIAL-DEV), and the remaining eight portfolio groups present in the low risk, high cost quadrant.

Consistent with disclosed embodiments, interface 500 may comprise one or more interaction items, such as text fields, buttons, drop down menus, links, hotspots, etc. (e.g., filter field 501, parameter menu 502, slider 503, time period button 504, and playback button 505). A user may operate CMMS 102 (e.g., using a keyboard, a mouse, a touch screen, or the like) in order to interact (e.g., enter text, select, adjust, etc.) one or more of the interaction items. Upon interaction with one or more of the interaction items, CMMS 102 may generate interface data (e.g., new or updated interface data) responsive to the received input. Additional details regarding interface data generated in response to received input is discussed below with respect to FIGS. 6 and 7A-D.

Figure 6:
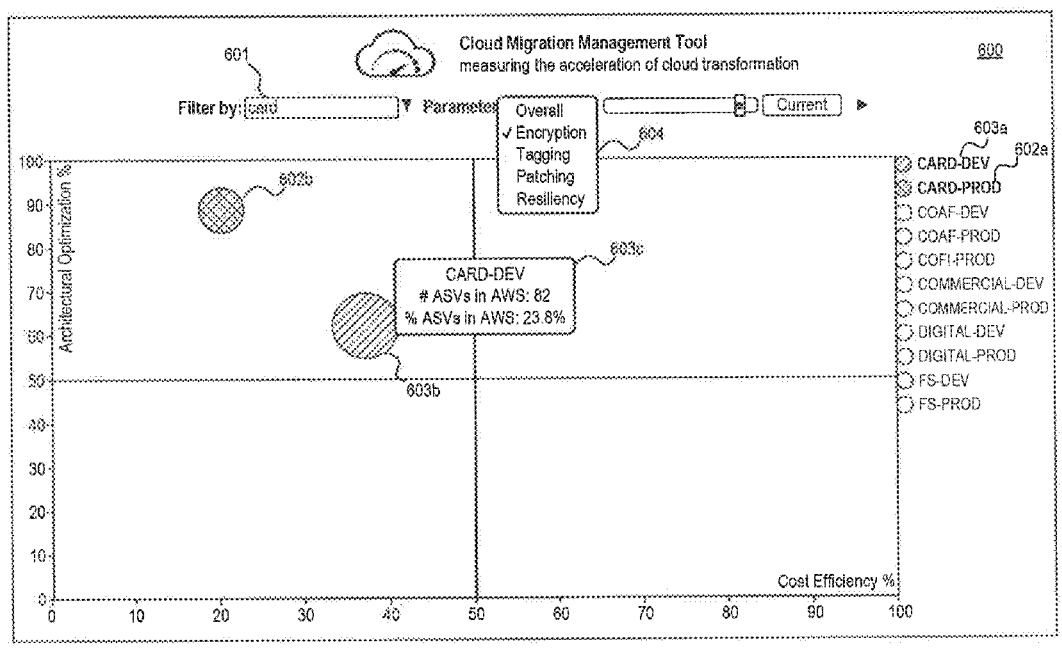
FIG. 6 is another diagram of an exemplary interface providing information associated with various exemplary cloud migration measurements and compliance metrics for software technology asset portfolio groups, consistent with disclosed embodiments.

FIG. 6 is another diagram of an exemplary interface 600 providing information associated with various exemplary cloud migration measurements and compliance metrics for portfolio groups of software technology assets, consistent with disclosed embodiments. As discussed above, a user may operate CMMS 102 to interact with one or more of the interaction items. For example, a user of CMMS 102 may interact with a filter field 601 to enter text into interface 600 for use in filtering the portfolio groups displayed in interface 600 according to a name, label, tag, designation, account, grouping, etc. associated with one or more desired portfolio groups. Thus, responsive to receiving the text "card" in filter field 601 of interface 600, CMMS 102 may generate interface data displaying only portfolio point 602b, associated with portfolio group 602a named "CARD-PROD," and portfolio point 603b, associated with portfolio group 603a named "CARD-DEV" from among the plurality of portfolio groups.

Consistent with disclosed embodiments, portfolio points may also serve as interaction items. For example, a user operating CMMS 102 may select portfolio point 603b (via, e.g., a mouse-click, hovering over, 3D touch gesture, etc.), and CMMS 102 may generate interface data for displaying a pop-up 603*c* providing additional details regarding the migration status of portfolio group 603*a*. In some embodiments, the additional details provided for a selected portfolio group may comprise the total number of applications migrated to the cloud and/or the percentage of applications in the portfolio group transferred to the cloud.

Interface 600 may also include a parameter menu 604, which a user may interact with to cause CMMS 102 to manipulate one or more aspects of interface 600. For example, parameter menu 604 may be a drop down menu listing one or more architectural component parameters to include in the determination of the architectural optimization position (e.g., the y-axis position in interface 600) for displayed portfolio groups. The one or more architectural component parameters may include, but are not limited to, encryption, tagging, patching, resiliency, or any combination thereof. Thus, continuing the above "card" filtering example, user of CMMS 102 may further interact with parameter menu 604 of interface 600 to select "Encryption," and CMMS 102 may generate interface data for displaying portfolio point 602*b* and portfolio point 603*b* having an architectural optimization position determined based on encryption metrics associated with portfolio group 602*a* and portfolio group 603*a* to the exclusion of other metrics (e.g., tagging, patching, and resiliency metrics associated with portfolio group 602*a* and portfolio group 603*a*).

FIGS. 7A-D are diagrams of an exemplary interface 700 providing information associated with various exemplary cloud migration measurements and compliance metrics for software technology asset portfolio groups over time, consistent with disclosed embodiments. As shown, interface 700 may include a slider 701, time period button 702, and playback button 703, which a user may interact with to cause CMMS 102 to manipulate one or more aspects of interface 700. For example, slider 701 may be a graphical control element with which a user may identify a current or past point in time by adjusting an indicator (e.g., a track bar or the like), and CMMS 102 may generate interface data for displaying portfolio points in interface 700 associated with the selected point in time. Similar in function, time period button 702 may comprise a drop down box by which a user may select a listed option to identify the current or past point in time, and CMMS 102 may generate interface data for displaying portfolio points in interface 700 associated with the selected point in time. Additionally or alternatively, time period button 702 may depict the time period selected via slider 701 or time period button 702. Playback button 703 may comprise a button that, when actuated, identifies a contiguous time period, and CMMS 102 may generate interface data for displaying a time lapse of portfolio points in interface 700 associated with the selected time period.

Thus, continuing the above "card" filtering example discussed with respect to FIG. 5, a user of CMMS 102 may further interact with slider 701 and/or time period button 702 of interface 700 to select a particular day, week, month, and/or year, and CMMS 102 may access data associated with architectural optimization position, efficiency position, and cloud migration implementation status of the relevant portfolio groups to generate interface data (or access previously generated interface data) associated with the selected time period. Similarly, if a user of CMMS 102 interacts with playback button 703, CMMS 102 may access data associated with architectural optimization position, efficiency position, and cloud migration implementation status of the relevant portfolio groups to generate interface data (or access previously generated interface data) for producing a time lapse of the identified time period. In some embodiments, the generated interface data responsive to the selection may reflect the architectural optimization position, efficiency position, and cloud migration implementation status of the relevant portfolio group at a single point in time during the selected time period (e.g., portfolio point position and size data for May 15), the average positions during the time period (e.g., average of all portfolio point position and size data for through all of May), the median positions during the time period (e.g., the mean portfolio point position and size data for all of May), etc. FIGS. 7A-D show an exemplary series of slider 701 time, period button 702, and/or playback button 703 interactions and resulting patent group points positions determined from interface data generated by CMMS 102.

Figure 7A:
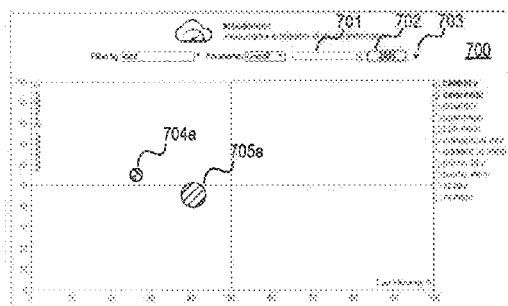
FIGS. 7A-D are diagrams of an exemplary interface providing information associated with various exemplary cloud migration measurements and compliance metrics for software technology asset portfolio groups over time, consistent with disclosed embodiments.
Figure 7B:
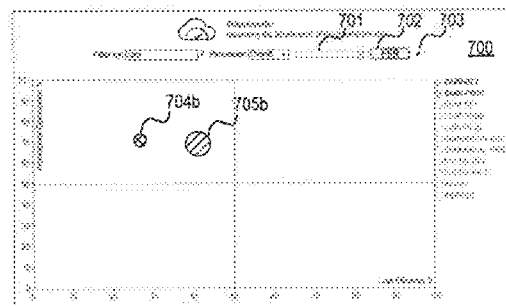
Figure 7C:
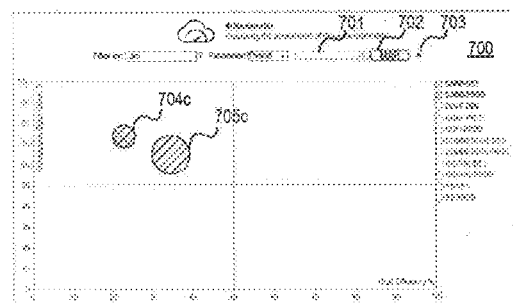
Figure 7D:
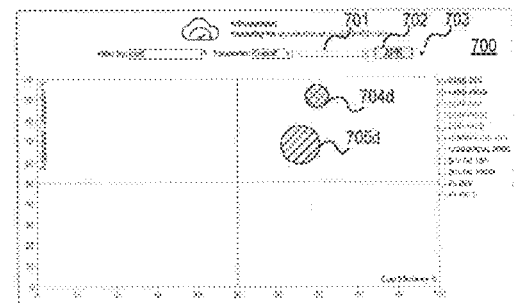

As shown in FIG. 7A, a user may interact with slider 701 and/or time period button 702 to identify the month January, and CMMS 102 may generate interface data determined for January of that year to display portfolio point 704*a* in the high cost, low risk quadrant and portfolio point 705*a* in the high cost, high risk quadrant. In FIG. 7B, a user may interact with slider 701 and/or time period button 702 to identify the month February, and CMMS 102 may generate interface data determined for February of that year to display portfolio point 704*b* in the high cost, low risk quadrant and portfolio point 705*b* in the high cost, low risk quadrant. In FIG. 7C, a user may interact with slider 701 and/or time period button 702 to identify the month March, and CMMS 102 may generate interface data determined for March of that year to again display portfolio point 704*c* in the high cost, low risk quadrant and portfolio point 705*c* in the high cost, low risk quadrant, but with an increased size for both portfolio point 704*c* and portfolio point 705*c*. In FIG. 7D, a user may interact with slider 701 and/or time period button 702 to identify the month April, and CMMS 102 may generate interface data determined for April of that year to display portfolio point 704*d* in the low cost, low risk quadrant and portfolio point 705*d* in the low cost, low risk quadrant. Consistent with disclosed embodiments, a user may interact with playback button 703, and CMMS 102 may generate interface data consistent with FIGS. 7A-D described above in time lapse form.

FIG. 8 is a diagram of an exemplary interface 800 providing information associated with various exemplary cloud migration measurements and compliance metrics for software technology asset portfolio groups at a software technology asset application level, consistent with disclosed embodiments. For ease of discussion, disclosed embodiments may refer to disclosed interfaces, including interface 800, being displayed on a CMMS 102; however, disclosed interfaces can be adapted for and displayed on other components of cloud migration environment 100, such as client device(s) 108.

Interface 800 may include an interface provided in table format (e.g., including columns and rows) providing metric compliance information according to cloud resource type for a listing of portfolio groups, which may be broken down further to the technology asset(s) of the portfolio group and/or further broken down to application instances of the technology asset(s). For example, interface 800 may comprise account column 804, ASV column 805, instance column 806, resource type column 807, and/or compliance measure sub-columns 808*a-d*. Consistent with disclosed embodiments, account column 804 may list one or more rows of portfolio groups 802, tagged technology assets 809, and/or application instances 803. Moreover, ASV column 805 may identify the application name of listed application instances 803, and instance column 806 may identify an instance name of listed application instances 803. In some embodiments, upon receiving a selection of a portfolio groups 802 in account column 804, CMMS 102 may generate interface data for expanding (or retracting, if already expanded) the listing to display all tagged technology assets 809 associated with the selected portfolio group 802. Similarly, upon receiving a selection of a portfolio tagged technology assets 809 in account column 804, CMMS 102 may generate interface data for expanding (or retracting, if already expanded) the listing to further display all application instances 803 associated with the selected tagged technology assets 809. Resource type column 807 may indicate the resource type associated with one or more compliance measure sub-columns 808a-d. Consistent with disclosed embodiments, compliance measure sub-columns 808a-d may include compliance indicators generated by CMMS 102 for each listed portfolio group 802, tagged technology asset 809, and/or application instances 803.

In particular, for each listed portfolio group 802 and/or tagged technology asset 809, interface 800 may include compliance measure sub-columns 808a-d having compliance indicators comprising the percentage (or other alphanumeric indicator) of application instances associated with each portfolio group 802 and/or tagged technology asset 809 that comply with user- and/or organizational defined architectural guidelines governing an organization's cloud migration. For example, as shown in FIG. 8, portfolio group SANDBOX-DEV (331) may comprise instances of which 33% are in tagging compliance, 83% are in encryption compliance, 41% are in patching compliance, and 12% are in resiliency compliance. In some embodiments, each compliance indicator may further include color-coding and/or a progress bar indicating compliance. Continuing the example, as also shown in FIG. 8, tagged software technology asset ASVINTELLIX (13) of portfolio group SANDBOX-DEV (331) may comprise instances of which 92% are in tagging compliance, 100% are in encryption compliance, 8% are in patching compliance, and 69% are in resiliency compliance. In some embodiments, each compliance indicator may further include color-coding and/or a progress bar indicating compliance.

For each listed application instance 803 listed in account column 804, interface 800 may include compliance measure sub-columns 808a-d having compliance indicators of a binary nature (e.g., check mark/"x" mark, yes/no, green/red color coding, etc.) denoting compliance of each application instance 803 with user- and/or organizational defined architectural guidelines governing an organization's cloud migration. For example, as shown in FIG. 8, for application instance "Intellix Mobile API Dev Web" (associated with tagged software technology asset ASVINTELLIX (13) of portfolio group SANDBOX-DEV (331), compliance measure sub-columns 808a-d lists a check mark for tagging compliance, encryption compliance, and resiliency compliance, but an "x" mark for patching compliance.

Interface 800 may further include resource selector buttons 801 comprising one or more interaction items (e.g., text fields, buttons, drop down menus, links, hotspots, etc.) for choosing the type of resource compliance information displayed in resource type column 807 and compliance measure sub-columns 808a-d. For example, resource selector buttons 801 may include selectable buttons associated with resources including, for example, EC2, RDS, EBG, EIB, S3, or any other cloud resource offered by a cloud provider. Consistent with disclosed embodiments, a user may operate CMMS 102 to select the "EC2" resource selector button 801, and CMMS 102 may generate interface data populating resource type column 807 with EC2-related compliance information for the listed portfolio groups. For example, as shown in interface 800, CMMS 102 may generate interface data indicating the selected resource type (i.e., "EC2") and compliance measures associated with EC2 resources (i.e., Tagging, Encryption, Patching, and Resiliency), as well as populating sub-columns 808a-d with compliance indicators for each listed portfolio group 802, tagged technology asset 809, and/or application instances 803. In some embodiments, the compliance measure sub-columns 808a-d displayed (and thus the compliance indicators) may depend on the selected resource type. Thus, the number of compliance metrics displayed for a given resource type (and thus number of compliance measure sub-columns displayed in interface 800) may vary. For example, a user may operate CMMS 102 to select the "EBS" resource selector button 801, and CMMS 102 may generate interface data populating resource type column 807 with EBS-related compliance information for the listed portfolio groups, including compliance measure sub-columns Tagging, Encryption, and Snapshots.

Figure 9:
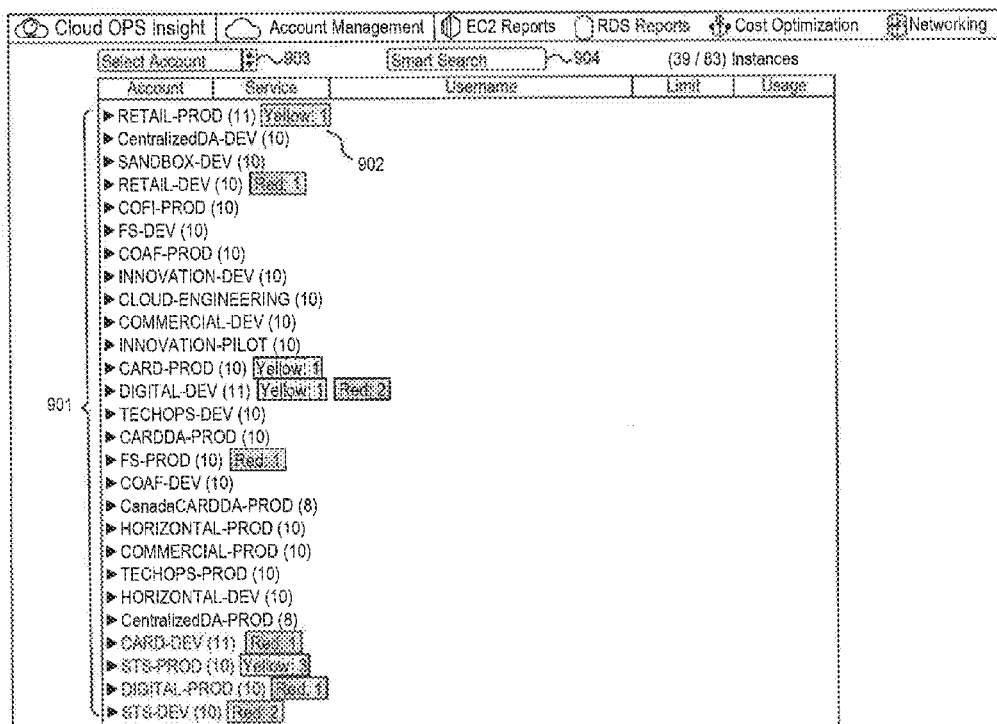
FIG. 9 is a diagram of an exemplary interface for reporting software technology asset limits information, consistent with disclosed embodiments.

FIG. 9 is a diagram of an exemplary interface for reporting software technology asset limits information, consistent with disclosed embodiments. For ease of discussion, disclosed embodiments may refer to disclosed interfaces, including interface 900, being displayed on a CMMS 102; however, disclosed interfaces can be adapted for and displayed on other components of cloud migration environment 100, such as client device(s) 108.

Providers of a cloud computing platform may provide limits on the number of resources and/or actions available to an organization and/or users in order to, for example, protect the cloud computing environment from runaway processes. Similarly, organizations utilizing a cloud computing environment may provide cloud migration protocols setting limits on cloud resources and/or actions.

Consistent with disclosed embodiments, interface 900 may provide an application limits report indicating when limits set by a cloud provider or organization are approached or reached. Such limits may include, but are not limited to, limits on a software technology asset's use of bandwidth, data transferred, storage, service hours, Virtual Private Clouds (VPCs), IP addresses allocated per VPC, subnets allocated per VPC, security groups per VPC, or any other measurable cloud consideration capable of affecting cloud performance and/or cost to the organization utilizing the cloud.

Consistent with disclosed embodiment, interface 900 may comprise a list 901 comprising one or more portfolio groups 901 and/or tagged technology assets (not shown). In some embodiments, upon receiving a selection of a portfolio groups 901, CMMS 102 may generate interface data for expanding (or retracting, if already expanded) the listing to display all tagged technology assets 809 associated with the selected portfolio group 901. Interface 900 may also comprise one or more flags 902 associated with one or more listed portfolio groups 901. According to some embodiments, flags 902 may indicate the number limits the portfolio group is nearing or exceeding. Additionally or alternatively, flags 902 may provide an indication of whether the flagged application instances near or already exceed a limit. For example, flag 902 may provide a color coded indicator of whether the compliance measure(s) of concern is nearing a limit (e.g., yellow) or already exceeded a limit (e.g., red).

Interface 900 may also include an account menu 903 and/or search field 904 for identifying a particular portfolio group 901. For example, account menu 903 may comprise an interaction item consistent with disclosed embodiments, such as a dropdown menu listing the list of portfolio groups 901 for selection of one or more particular portfolio groups 901. Search field 904 may comprise, for example, a text field for receiving text entered by a user of CMMS 102 to identifying one or more particular portfolio groups 901. Consistent with disclosed embodiments, in response to receiving user input identifying one or more particular portfolio groups 901, CMMS 102 may generate new or updated interface data (see, e.g., FIG. 10, discussed below) to provide additional limit report details for the identified one or more particular portfolio groups 901.

Figure 10:
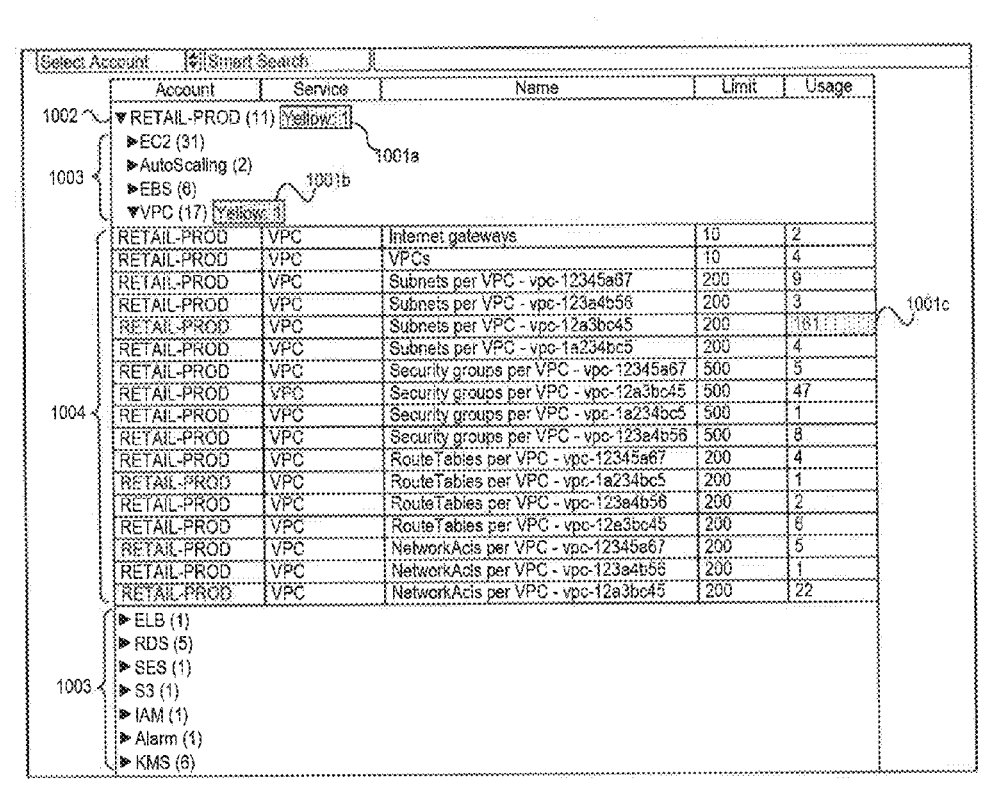

FIG. 10 is a diagram of an exemplary interface for reporting further software technology asset limits information, consistent with disclosed embodiments. For ease of discussion, disclosed embodiments may refer to disclosed interfaces, including interface 1000, being displayed on a CMMS 102; however, disclosed interfaces can be adapted for and displayed on other components of cloud migration environment 100, such as client device(s) 108.

Consistent with disclosed embodiments, interface 1000 may provide an application limits report indicating that limits set by a cloud provider or organization are being neared or reached. For example, as depicted in FIG. 10, interface 1000 may include a portfolio group list 1002 comprising the portfolio group "RETAIL-PROD (11)" having a flag 1001*a* (i.e., "Yellow: 1") indicating that RETAIL-PROD (11) includes a compliance measure that is nearing a cloud limit. Consistent with disclosed embodiments, interface 1000 may further include a cloud resource sub-listing 1003 comprising one or more cloud resources associated with the listed portfolio groups 1002. Similar to portfolio group list 1002, cloud resource sub-list 1003 may include one or more flags indicating one or more compliance measurements are near or exceed a cloud limit. For example, as shown in FIG. 10, cloud resource sub-list 1003 may include a flag 1001*b* (i.e., "Yellow: 1") indicating that cloud resource VPC (17) includes an application instance that is nearing a cloud limit. Consistent with disclosed embodiments, interface 1000 may further include a cloud measures sub-listing(s) 1004 comprising cloud measures and associated limits associated with each cloud resource in cloud resource sub-list 1003, as well as additional information. For example, cloud measures sub-listing(s) 1004 may also indicate the name of the cloud measurement/limit, the numerical limit associated with the cloud measure, current usage, warning indicators that current usage approaches or exceeds a limit, etc. For example, as shown in FIG. 10, application instance sub-listing(s) 1004 may include a warning indicator 1001*c* for cloud measure "Subnets per VPC-vpc-12a3bc45" indicating that the current subnet usage of 161 subnets by VPC 12a3bc45 nears the limit of 200 subnets set for that particular VPC of RETAIL-PROD.

Consistent with disclosed embodiments, each portfolio group in portfolio group list 1002 and each cloud resource sub-listing 1003 may be selectable such that, upon receiving a selection, CMMS 102 may generate interface data for expanding (or retracting, if already expanded) the listing or sub-listing. For example, upon receiving a selection of a cloud resource in cloud resource sub-listing 1003, CMMS 102 may generate interface data for expanding (or retracting, if already expanded) the sub-listing to display cloud measures list 1004 comprising one or more cloud measures and limits associated with the selected cloud resource in sub-listing 1003.

Figure 11:
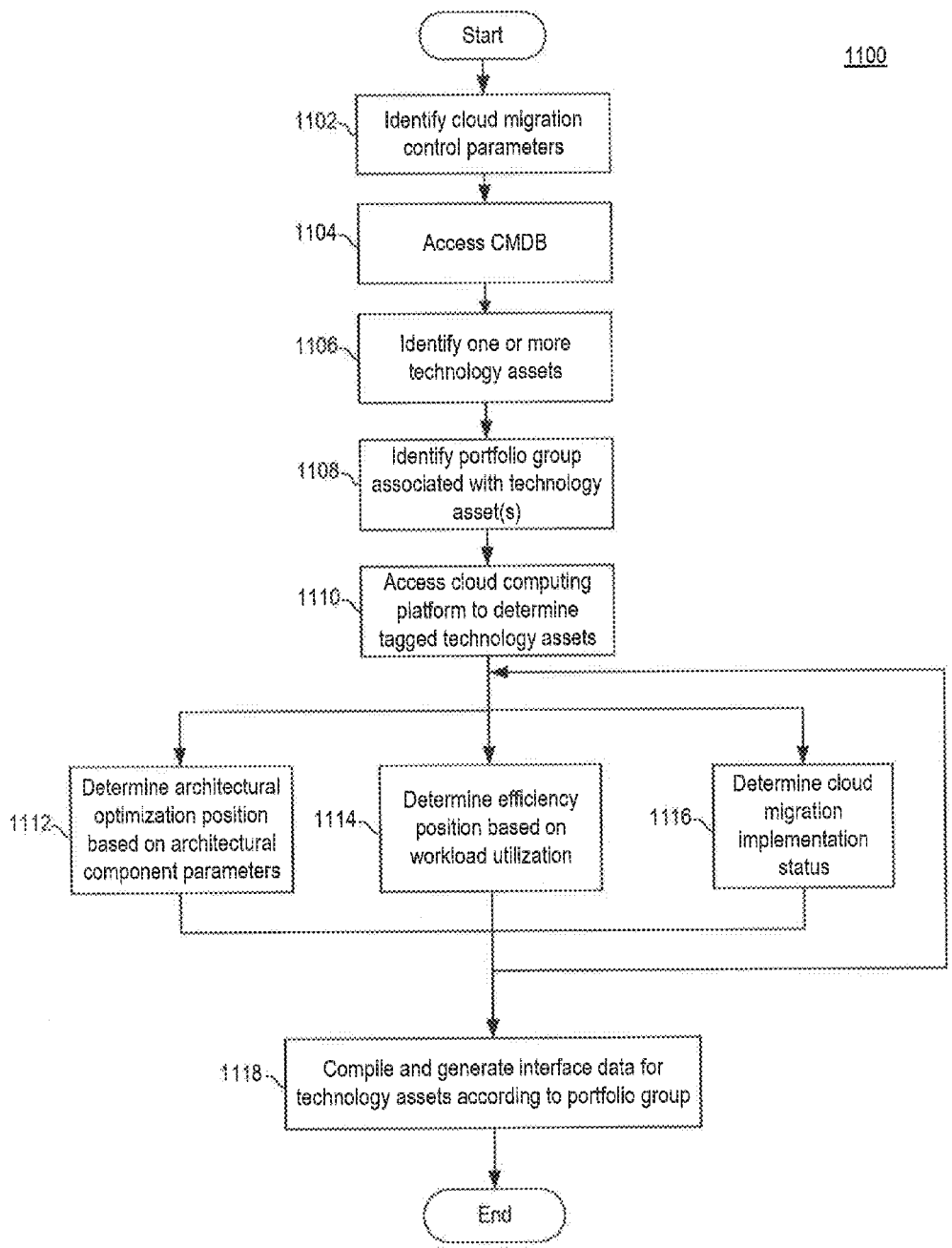
FIG. 11 is a flowchart of an exemplary process for generating interface data representing an aggregate status of the plurality of technology assets by portfolio group, consistent with disclosed embodiments.

FIG. 11 is a flowchart of an exemplary process 1100 for generating interface data representing an aggregate status of the plurality of technology assets by portfolio group, consistent with disclosed embodiments. Process 1100 is described with respect to CMMS 102; however, the process could be implemented in other contexts, including as software programs or specialized hardware found in other components of cloud migration environment 100.

In step 1102, CMMS 102 may identify a plurality of cloud migration control parameters. The cloud migration control parameters may comprise user- and/or organization-defined operational criteria and cost metrics that govern expectations for risk mitigation and cost optimization when migrating software technology assets to the cloud. Thus, in some embodiments, CMMS 102 may determine cloud deployment readiness of software technology assets according to the cloud migration control parameters accessed from storage accessible to CMMS 102 via local network 112 (e.g., database 370, CMDB 110, etc.) and/or storage associated with cloud computing platform(s) 104 (e.g., file system(s) 104G and/or database(s) 104H). CMMS 102 may identify the plurality of cloud migration control parameters by accessing a data store via in any communications protocol, such as REST, SOAP, XML, binary, etc. using, e.g., Network 114 and/or Local Network 112. Additionally or alternatively, CMMS 102 may determine one or more of the plurality of cloud migration control parameters based on, for example, cloud control migration parameters identified from storage accessed by CMMS 102 and/or cloud computing platform(s) 104. For example, as shown above with respect to Table 1, CMMS 102 may determine one or more cloud migration control parameters based on a resource type(s) associated with a software technology asset.

In step 1104, CMMS 102 may access Configuration Management Database (CMDB) 110 identifying software technology assets of an organization and other information about the IT infrastructure of the organization. As discussed above in relation to FIG. 1, CMDB 110 may be an enterprise system of record storing information associated with software technology assets of an organization, which servers and databases facilitate which IT services, their location (e.g., IP address, etc.), capacity (e.g., server capacity, memory capacity, etc.), and other such information about the IT infrastructure. CMDB 110 may identify software technology assets of an organization regardless of whether the software assets are deployed in data center(s) 106 or cloud computing platform(s) 104. Thus, consistent with disclosed embodiments, CMDB 110 may identify the software technology assets of the organization deployed in both data center(s) 106 and cloud computing platform(s) 104.

In step 1106, CMMS 102 may identify a plurality of software technology assets of an organization. For example, CMMS 102 may access CMDB 110 via an asset list Application Program Interface (API) and identify the software technology assets by application names associated with each asset.

In step 1108, CMMS 102 may determine a portfolio group associated with each of the identified software technology assets. For example, CMMS 102 may analyze the records for each software technology asset accessed from CMDB 110 to determine a portfolio group to which each software technology asset belongs.

In step 1110, CMMS 102 may access a cloud computing platform to determine a plurality of tagged technology assets. For example, CMMS 102 may access one more file systems 104G or databases 104H of cloud computing platform 104 via at least one tagged list API to identify tagged technology assets having an application name identified in the cloud computing platform. Consistent with disclosed embodiments, tagged software technology assets may correspond to a subset of software technology assets listed in CMDB 110 that have migrated, at least partially, to cloud computing platform 104.

In step 1112, CMMS 102 may continually determine an architectural optimization position for each of the portfolio groups based on operational criteria and architectural component parameters of each of the plurality of tagged technology assets associated with a given portfolio group. For example, CMMS 102 may access cloud computing platform 104 to determine the coded architecture of all tagged technology assets of a portfolio to determine each tagged technology asset's implementation status according to a plurality of architecture metrics (e.g., patching, encryption, resiliency, and tagging metrics). For example, CMMS 102 may access data associated with each tagged technology asset stored in cloud computing platform(s) 104 (e.g., file system(s) 104G and/or database(s) 104H) to determine, for each tagged technology asset, the last time the operating system, applications, and/or supported data for underlying application instances became patched, what data associated with each tagged technology asset is encrypted, which software technology assets are associated with an autoscaling group, and/or what tagging information has been provided for each tagged technology asset. CMMS 102 may then determine an architectural optimization position for each portfolio group based on the overall coded architecture and implementation status of the plurality of tagged technology assets for a given portfolio group according to disclosed embodiments. In some embodiments, the architectural optimization position may represent a y-axis position on an (x, y) coordinate plane for a portfolio point associated with a portfolio group.

In step 1114, CMMS 102 may continually determine an efficiency position for each portfolio group based at least on workload utilization for each tagged technology asset and the cost metrics associated with a given portfolio group. For example, CMMS 102 may access cloud computing platform 104 (e.g., file system(s) 104G and/or database(s) 104H) to determine the workload utilization status of each tagged technology assets of the portfolio group and compare them to one or more user- and/or organization-defined cost metrics outlining efficiency expectations. For example, CMMS 102 may access cloud computing platform 104 to identify the amount of cloud resources reserved for each tagged technology asset and the amount of cloud resources consumed. If the percentage of reserved cloud resources actually consumed by a tagged technology asset falls below a threshold (or any other cost metric set by a user or organization), CMMS 102 may determine that tagged technology asset is identified for cost optimization. CMMS 102 may then determine the efficiency position for each portfolio group based on the workload utilization statuses for the plurality of tagged technology assets for a given portfolio group. In some embodiments, the efficiency position may represent an x-axis position on an (x, y) coordinate plane for a portfolio point associated with a portfolio group.

In step 1116, CMMS 102 may continually determine a cloud migration implementation status based on at least one transition statistic. For example, CMMS 102 may determine the percentage of software technology assets belonging to the portfolio group implemented in the cloud based on the number of technology assets identified in CMDB 110 tagged in cloud computing platform 104. Consistent with disclosed embodiments, the cloud migration implementation status may indicate the size of a portfolio point associated with a given portfolio group. For example, the portfolio point may increase in size as the percentage of software technology assets for a given portfolio group rises.

In step 1118, CMMS 102, may generate interface data representing the aggregate status of the plurality of technology assets by portfolio group according to the determined architectural optimization position, efficiency position, and cloud migration implementation status. For example, CMMS 102 may generate interface data for rendering disclosed interfaces on a display, as described with respect to FIGS. 4-7D.

Figure 12:
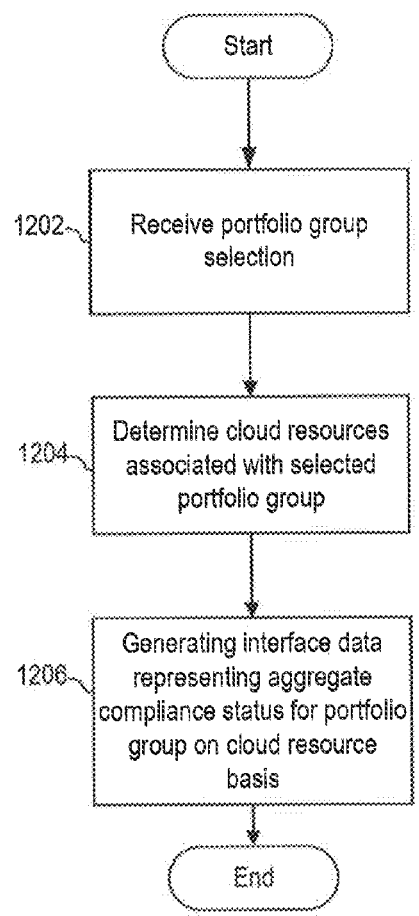
FIG. 12 is a flowchart of an exemplary process for generating interface data representing an aggregate status of the plurality of technology assets on a per cloud resource basis, consistent with disclosed embodiments.

FIG. 12 is a flowchart of an exemplary process for generating interface data representing an aggregate status of the plurality of technology assets on a per cloud resource basis, consistent with disclosed embodiments. Process 1200 is described with respect to CMMS 102; however, the process could be implemented in other contexts, including as software programs or specialized hardware found in other components of cloud migration environment 100.

In step 1202, CMMS 102 may receive a portfolio group selection identifying one or more portfolio groups from a plurality of portfolio groups. For example, CMMS 102 may receive a portfolio group selection from a user operating CMMS 102 to enter a portfolio group name into the search field of a disclosed interface (e.g., filter field 501 of interface 500). Other selection means are contemplated. In step 1204, CMMS 102 may determine which cloud resources are associated with the selected portfolio group(s). For example, as discussed above, different portfolio groups may employ different cloud resources because of, for example, different intended function(s) of the software technology assets associated with the portfolio group. In step 1206, CMMS 102 may generate interface data representing aggregate compliance status for portfolio group on cloud resource basis. For example, CMMS 102 may generate interface data for rendering disclosed interfaces on a display, as described with respect to FIGS. 8-10.

Figure 13:
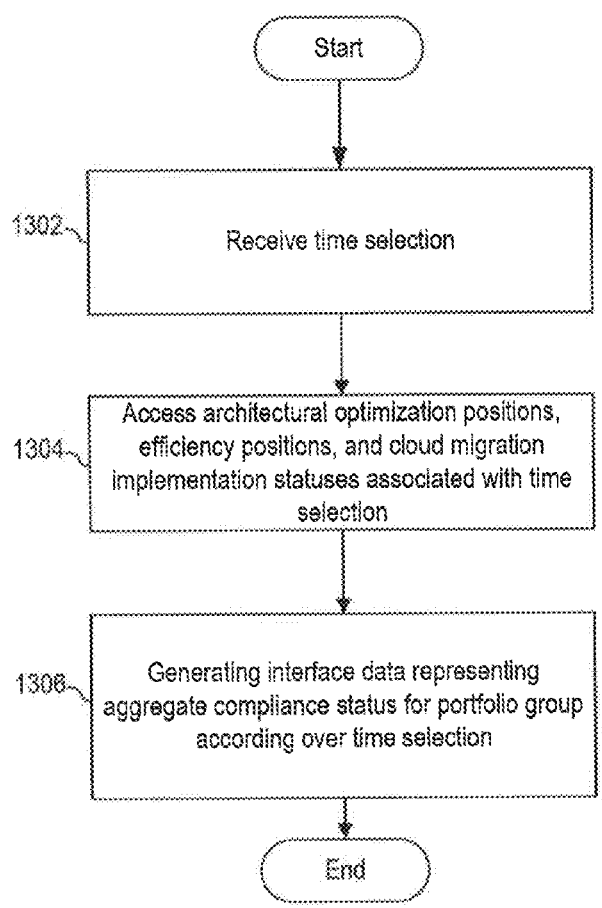
FIG. 13 is a flowchart of an exemplary process for generating interface data representing an aggregate status of the plurality of technology assets over time, consistent with disclosed embodiments.

FIG. 13 is a flowchart of an exemplary process 1300 for generating interface data representing an aggregate status of the plurality of technology assets over time, consistent with disclosed embodiments. Process 1300 is described with respect to CMMS 102; however, the process could be implemented in other contexts, including as software programs or specialized hardware found in other components of cloud migration environment 100.

In step 1302, CMMS 102 may receive a time selection. For example, CMMS 102 may receive a time selection from a user operating CMMS 102 to actuate one or more interaction items of a disclosed interface (e.g., slider 503, 701, time period button 504, 702, and playback button 505, 703). In step 1304, CMMS 102 may access architectural optimization position, efficiency position, and cloud migration implementation statuses associated with the time selection. For example, CMMS 102 may access data associated with architectural optimization position, efficiency position, and cloud migration implementation status of relevant portfolio groups (or access previously generated interface data) generated by CMMS 102 at or during the selected time period. In step 1306, CMMS 102 may generate interface data representing the aggregate compliance status of one or more portfolio groups over time. For example, CMMS 102 may generate interface data for rendering disclosed interfaces on a display, as described with respect to FIGS. 7A-D.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, Python, or any such programming languages. One or more of such software sections or modules can be integrated into a computer system, non-transitory computer-readable media, or existing communications software.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors configured as special-purpose processor(s) based on software instructions that are programmed with logic and instructions that perform, when executed, one or more operations consistent with the disclosed embodiments. Moreover, aspects of the disclosed embodiments may be implemented on specialized (rather than generic) equipment or devices.

Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A cloud migration system for automated monitoring of compliance with cloud migration protocols, comprising:
   a Configuration Management Database (CMDB); and
   one or more processors in communication with the CMDB and configured to execute stored software instructions to:
   identify a plurality of cloud migration control parameters for assessing cloud deployment readiness of software technology assets according to operational criteria and cost metrics;
   access the CMDB, via at least one asset list Application Programming Interface (API), to identify a plurality of technology assets having application names;
   determine a portfolio group associated with each of the identified plurality of technology assets from a plurality of portfolio groups;
   access, via at least one tagged list API, a cloud computing platform to determine a plurality of tagged technology assets, each tagged technology asset having an application name identified in the cloud computing platform;
   continually determine an architectural optimization position for the plurality of tagged technology assets based on architectural component parameters of each of the plurality of tagged technology assets and the operational criteria;
   continually determine an efficiency position for the plurality of tagged technology assets based at least on workload utilization for each tagged technology asset and the cost metrics;
   continually determine a cloud migration implementation status based on at least one transition statistic; and
   generate interface data representing an aggregate status of the plurality of technology assets having application names by portfolio group according to the determined architectural optimization position, efficiency position, and cloud migration implementation status.

2. The cloud migration system of claim 1, wherein the architectural component parameters comprise architectural criteria for computing environment infrastructure components, including at least patching, encryption, resiliency, and tagging;
   wherein the workload utilization comprises a percentage of tagged technology assets identified for cost optimization, and wherein the at least one transition statistic comprises a percentage of the identified technology assets having application names that are included in the determined tagged technology assets.

3. The cloud migration system of claim 2, wherein patching criteria includes a percentage of virtual appliances created within an immediately prior time period, encryption criteria includes a percentage of data volumes associated with a storage resource that are encrypted data volumes, resiliency criteria includes a percentage of tagged technology assets that are associated with an autoscaling group, and tagging criteria includes a percentage of tagged technology assets identified in the cloud computing platform according to a predetermined format.

4. The cloud migration system of claim 3, wherein the architectural component parameters used to continually determine the architectural optimization position depend on a classification of each tagged technology asset as one of a computing resource, a network resource, and a storage resource.

5. The cloud migration system of claim 1, wherein the operational criteria and cost metrics are defined per portfolio group.

6. The cloud migration system of claim 5, wherein the one or more processors are configured to execute stored software instructions to perform further operations comprising:
   receiving a selection of a portfolio group from among the plurality of portfolio groups; and
   determining, for the selected portfolio group, at least one cloud resource employed by each portfolio group.

7. The cloud migration system of claim 6, wherein the operational criteria and cost metrics are defined on a portfolio group basis and wherein generating the interface data comprises generating interface data for representing an aggregate status of the plurality of technology assets associated with only the selected portfolio group according to the architectural optimization, efficiency position, and cloud migration implementation status determinations.

8. The cloud migration system of claim 2, wherein the generated interface data configures a display to present a plurality of plot points on a coordinate plane corresponding to the plurality of portfolio groups, wherein each plot point includes a first-axis coordinate and a second-axis coordinate corresponding to a determined portfolio group, and wherein the architectural optimization position provides the first-axis coordinate, the efficiency position provides the second-axis coordinate, and the cloud migration implementation status provides a size of each respective plot point.

9. The cloud migration system of claim 8, wherein the one or more processors are configured to execute stored software instructions to perform further operations comprising:
receiving filtering criteria from a user; and
generating updated interface data configuring the display to present plot points on the coordinate plane corresponding to only portfolio groups meeting the received filtering criteria.

10. The cloud migration system of claim 9, wherein the filtering criteria includes a selection of an architectural criterion from the architectural criteria for computing environment infrastructure components, and wherein the updated interface data provides architectural optimization positions determined for the plurality of tagged technology assets according to only architectural component parameters of each tagged technology asset associated with the selected architectural criterion.

11. The cloud migration system of claim 1, wherein the one or more processors are configured to execute stored software instructions to perform further operations comprising:
storing previously determined architectural optimization positions, efficiency positions, and cloud migration implementation statuses according to a determination time;
receiving a time selection from a user;
accessing the previously determined architectural optimization positions, efficiency positions, and cloud migration implementation statuses for the determination time corresponding to the time selection; and
generating interface data for the plurality of technology assets by portfolio group according to the previously determined architectural optimization positions, efficiency positions, and cloud migration implementation statuses.

12. The cloud migration system of claim 8, wherein the one or more processors are configured to execute stored software instructions to perform further operations comprising:
storing previously determined architectural optimization positions, efficiency positions, and cloud migration implementation statuses for the plurality of technology assets during first time period;
receiving a playback selection from a user; and
generating interface data configuring the display to present a time-lapse of the plurality of plot points corresponding to the plurality of portfolio groups based on the accessed previous determinations during the first time period.

13. The cloud migration system of claim 1, wherein the interface data comprises data to display at least one alert notifying a user of a failure of one or more portfolio groups to meet predefined thresholds for the determined architectural optimization position, efficiency position, and cloud migration implementation status.

14. A cloud migration system for automated monitoring of compliance with cloud migration protocols, comprising:
a Configuration Management Database (CMDB); and
one or more processors in communication with the CMDB and configured to execute stored software instructions to:
identify a plurality of cloud migration control parameters for assessing cloud deployment readiness of software technology assets according to operational criteria and cost metrics;
access the CMDB, via at least one asset list Application Programming Interface (API), to identify a plurality of technology assets having application names;
determine a portfolio group associated with each of the identified plurality of technology assets from a plurality of portfolio groups;
access, via at least one tagged list API, a cloud computing platform to determine a plurality of tagged technology assets, each tagged technology asset having an application name identified in the cloud computing platform;
continually determine architectural component parameters of each of the plurality of tagged technology assets, the architectural component parameters comprising architectural criteria for computing environment infrastructure components, including at least patching, encryption, resiliency, and tagging;
continually determine a workload utilization for each tagged technology asset, the workload utilization comprising a percentage of tagged technology assets identified for cost optimization; and
generate interface data representing an aggregate status of the plurality of tagged technology assets based on the operational criteria and cost metrics.

15. The cloud migration system of claim 14, wherein patching criteria includes a percentage of virtual appliances created within an immediately prior time period, encryption criteria includes a percentage of data volumes associated with a storage resource that are encrypted data volumes, resiliency criteria includes a percentage of tagged technology assets that are associated with an autoscaling group, and tagging criteria includes a percentage of tagged technology assets identified in the cloud computing platform according to a predetermined format.

16. The cloud migration system of claim 14, wherein the interface data configures a display to present a listing of the plurality of portfolio groups, the listing indicating a percentage, for each architectural criteria, of the tagged technology assets within a listed portfolio group satisfying the architectural criteria and the cost metrics.

17. The cloud migration system of claim 16, wherein the listing further comprises a sub-listing, associated with each portfolio group, comprising the tagged technology assets within the listed portfolio group, the sub-listing indicating whether each listed tagged technology asset complies with each architectural criteria and each of the cost metrics.

18. The cloud migration system of claim 14, wherein the interface data configures a display to present a listing of the plurality of portfolio groups, the listing indicating a number of tagged technology assets within a listed portfolio group that do not comply with at least one architectural criteria or at least one of the cost metrics.

19. The cloud migration system of claim 14, wherein the interface data comprises data to display at least one alert notifying a user of a failure of one or more portfolio groups to meet predefined thresholds for the determined architectural component parameters and workload utilization.

20. A computerized method for automated monitoring of compliance with cloud migration protocols, comprising:
identifying a plurality of cloud migration control parameters for assessing cloud deployment readiness of software technology assets according to operational criteria and cost metrics;

accessing a Configuration Management Database (CMDB), via at least one asset list Application Programming Interface (API), to identify a plurality of technology assets having application names;

determining a portfolio group associated with each of the identified plurality of technology assets from a plurality of portfolio groups;

access, via at least one tagged list API, a cloud computing platform to determine a plurality of tagged technology assets, each tagged technology asset having an application name identified in the cloud computing platform;

continually determining, via a cloud migration management server, an architectural optimization position for the plurality of tagged technology assets based on architectural component parameters of each of the plurality of tagged technology assets and the operational criteria;

continually determining, via a cloud migration management server, an efficiency position for the plurality of tagged technology assets based at least on workload utilization for each tagged technology asset and the cost metrics;

continually determining, via a cloud migration management server, a cloud migration implementation status based on at least one transition statistic; and generating interface data representing an aggregate status of the plurality of technology assets having application names by portfolio group according to the determined architectural optimization position, efficiency position, and cloud migration implementation status.

* * * * *